(12) United States Patent
Preston

(10) Patent No.: US 8,131,405 B2
(45) Date of Patent: Mar. 6, 2012

(54) METHOD AND APPARATUSES FOR CONTROLLING HIGH WING LOADED PARAFOILS

(75) Inventor: Daniel J. Preston, Kew Gardens, NY (US)

(73) Assignee: ATAIR Aerospace, Inc. NY (US)

( * ) Notice: Subject to any disclaimer, the term of this patent is extended or adjusted under 35 U.S.C. 154(b) by 1313 days.

(21) Appl. No.: 11/185,411

(22) Filed: Jul. 20, 2005

(65) Prior Publication Data

US 2007/0088466 A1    Apr. 19, 2007

(51) Int. Cl.
*G01C 23/00*    (2006.01)
(52) U.S. Cl. .................. 701/3; 701/4; 701/36; 701/207; 701/213; 701/214
(58) Field of Classification Search .................. 701/3, 4, 701/36, 207, 213, 214; 244/142, 152
See application file for complete search history.

(56) References Cited

U.S. PATENT DOCUMENTS 4,846,421 A  *  7/1989  Trikha .................... 244/122 AE
(Continued)

*Primary Examiner* — Khoi Tran
*Assistant Examiner* — Jorge Peche
(74) *Attorney, Agent, or Firm* — Bourque and Associates, PA

(57) ABSTRACT

An adaptive guidance system (AGS) regulates the altitude and heading of a parasail to arrive at a target at a prescribed altitude. Since the altitude profile depends both on unknown wing loading, and wind magnitude and direction, the AGS estimates the glide slope and wind on the fly and provides a command to a stability augmentation system (SAS) that results in the desired glide slope and heading by performing a sequence of maneuvers and sensing the response. According to one embodiment, the SAS operates in the linear region and includes a PID controller that uses the difference between the actual heading and heading command to create an actuator output. The actuator output is limited by a position/rate limiter that imposes the physical limitations of the response time of the actuator/servos and position limits to prevent entering the nonlinear region. Alternatively, an adaptive SAS operates in both the linear and nonlinear region and includes a neural network (NN) that receives an error signal (difference between a reference model and actual heading) which is used to adapt the weights of the NN.

6 Claims, 10 Drawing Sheets

U.S. PATENT DOCUMENTS

| | | | |
|---|---|---|---|
| 5,522,567 A * | 6/1996 | Kinstler | 244/3.15 |
| 5,901,924 A * | 5/1999 | Strieber | 244/13 |
| 6,338,457 B1 * | 1/2002 | Hilliard et al. | 244/139 |
| 6,343,244 B1 * | 1/2002 | Yoneda et al. | 701/3 |
| 6,416,019 B1 * | 7/2002 | Hilliard et al. | 244/139 |
| 6,574,532 B2 * | 6/2003 | Lohmiller | 701/3 |
| 6,758,442 B2 * | 7/2004 | Bailey | 244/142 |
| 6,889,942 B2 * | 5/2005 | Preston | 244/152 |
| 7,272,470 B2 * | 9/2007 | Lohmiller | 701/3 |
| 7,356,390 B2 * | 4/2008 | Knoblach et al. | 701/4 |
| 2002/0070315 A1 * | 6/2002 | Hilliard et al. | 244/139 |
| 2003/0197095 A1 * | 10/2003 | Preston | 244/152 |
| 2004/0084567 A1 * | 5/2004 | Bailey | 244/152 |
| 2004/0153218 A1 * | 8/2004 | Lohmiller | 701/3 |
| 2005/0014499 A1 * | 1/2005 | Knoblach et al. | 455/431 |
| 2006/0032984 A1 * | 2/2006 | Preston | 244/152 |
| 2007/0233382 A1 * | 10/2007 | Preston | 701/213 |

* cited by examiner

METHOD AND APPARATUSES FOR CONTROLLING HIGH WING LOADED PARAFOILS

CROSS-REFERENCE TO RELATED APPLICATIONS

This application claims the benefit of U.S. Provisional Application Ser. No. 60/568,539, filed May 5, 2004.

TECHNICAL FIELD

The present invention relates to parasails and more particularly, relates to guidance and stability augmentation systems for use with guided parasails.

BACKGROUND INFORMATION

Guided parasails 10, FIG. 1, provide a means of achieving precision delivery of supplies 12 from air 14 to ground 16. Guided parasails 10 are often static line deployed from an aircraft (not shown) at altitudes up to approximately 35,000 feet.

According to one embodiment, a guided parasail 10 includes a guidance system that outputs a heading rate command and a stability augmentation system (SAS) that follows (executes) that command. The guidance system typically includes an on-board flight computer that determines the position and heading of the parasail 10, usually based on a GPS and Inertial Navigation Sensors (INS) or the like. The guidance system regulates the altitude and heading of a parasail in such a way that it arrives at the target site at a prescribed altitude (very similar to the problem of landing an aircraft). The altitude profile (altitude versus range to the target site) depends both on wing loading, and wind magnitude and direction, both of which may be unknown at the outset.

Lightly wing-loaded parafoils 10 have basically a linear response to input control. At very high wing-loads, however, the response to input control becomes highly non-linear. Consequently, small input controls may result in large and undesirable responses. This is particularly problematic and can result in a spiraling descent from which there is no recovery (an instability). The difficulty in designing a SAS is that the nature of this nonlinearity (where it begins to happen and to what degree) is not known ahead of time because it depends on wing loading. Also, the behavior in turning in one direction may be different from the behavior in turning in another direction. Moreover, even if the nonlinearity was known, designing the control system would still be difficult because the state of the art in control system design relies heavily on having a linear response.

Accordingly, there exists a need for an improved SAS system that operates in the linear region. The system should take into account the physical limitations of the actuators/servos used to affect the controls as well as should limit the rate of turn to prevent entering the nonlinear region.

There also exists a need for an adaptive guidance system that is able to ascertain (estimate) the glide slope and wind conditions on the fly, and provide a command to the SAS that will result in attaining the desired glide slope and heading.

Moreover, there exists a need for an adaptive SAS system that operates in both the linear and the nonlinear region. This is due to the need to design intelligent, self-learning systems that enable users to adopt and deploy the equipment in the most practical manner. That is, there is a need to self adapt to a variety of drop conditions, payloads and wing loadings. Not doing this puts unneeded restrictions on users. These restrictions will often not be adhered to, sacrificing accuracy and reliability. An adaptive guidance and adaptive SAS design permits systems to fly correctly with asymmetrically rigged payloads or correct for damage-induced asymmetries mid-flight. Additionally, adaptive algorithms will permit varying cargo weights to be rigged under a given system, without any inputted data into mission planning.

It is important to note that the present invention is not intended to be limited to a system or method which must satisfy one or more of any stated objects or features of the invention. It is also important to note that the present invention is not limited to the preferred, exemplary, or primary embodiment(s) described herein. Modifications and substitutions by one of ordinary skill in the art are considered to be within the scope of the present invention, which is not to be limited except by the following claims.

SUMMARY

According to one embodiment, the present invention features a method of guiding a parasail from a first location to a target location. The method includes estimating an equilibrium glide velocity, an equilibrium glide angle, (preferably by averaging GPS data) and the height of the parasail above the Earth's surface. The method also turns the parasail to align the parasail with a target heading. A desired altitude for the current range to the target location is computed based on the estimated equilibrium glide velocity, equilibrium glide angle, and height above the Earth's surface. A turn is executing until the parasail arrives near, but not below, the desired altitude. Command weaves are initiated, as needed, to maintain an altitude error below a prescribed limit and a turn rate proportional to the heading error is initiated. Lastly, a terminal spiral is initiated when the parasail is approximately over the target site.

According to another embodiment, the present invention features a stability augmentation (SAS) method. The SAS method includes receiving a heading rate command from a guidance system, receiving an actual heading rate (preferably from an attitude and heading reference system). The actual heading rate signal is preferably filtered to remove noise and harmonic terms. Next, the heading rate command and the actual heading rate are compared to generate an error signal proportional to the difference between the heading rate command and the actual heading rate, and generating an actuator command based on the error signal using a proportional, integral, derivative controller. The actuator command is preferably limited in view of a model of an actuator's response and a maximum rate of heading change to prevent operation in a nonlinear flight response region.

According to yet a further embodiment, the present invention features a stability augmentation (SAS) method that is capable of operating in both the linear and nonlinear flight regions of a parasail. The SAS method includes generating a reference model output based on a reference model, receiving an actual heading rate, generating an error signal, the error signal proportionate to the difference between the reference model output and the actual heading rate, and generating an adaptive signal using a neural network. The weights of the neural network are preferably adapted based on the error signal. The SAS method also preferably includes inputting a plurality of known variables into said neural network such as, but not limited to, the heading rate, the reference model output, and a control input to an actuator.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
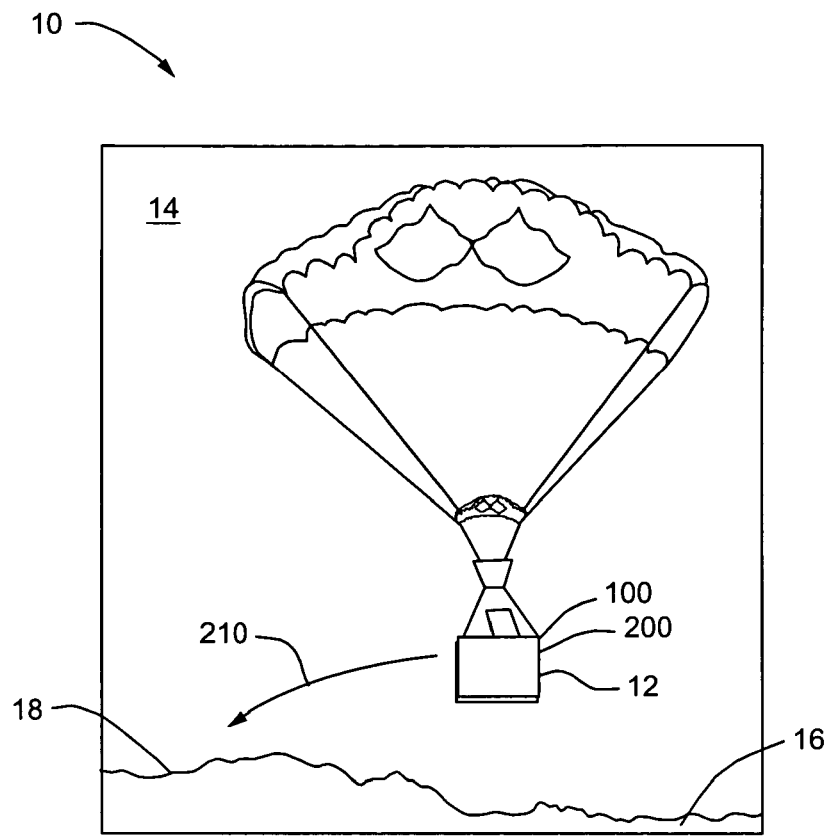
FIG. 1 is plan view of one embodiment of a guided parasail.

According to one embodiment, the present invention features an adaptive guidance system 100, FIG. 1, used in conjunction with a stability augmentation system (SAS) to control a parasail 10. The function of the adaptive guidance system 100 is to regulate the altitude and heading of a parasail 10 in such a way that it arrives at the target site 18 at a prescribed altitude (very similar to the problem of landing an aircraft) and to provide heading rate commands to the SAS 200 for execution. The altitude profile (altitude versus range to the target site) depends both on wing loading, and wind magnitude and direction, both of which may be unknown at the outset. Accordingly, the purpose of adaptive guidance system 100 is to ascertain (estimate) the glide slope and wind conditions on the fly, and to provide a command to the SAS 200 that will result in attaining the desired glide slope and heading 210.

As will be explained in greater detail hereinbelow, the guidance system 100 performs a sequence of maneuvers and observes (senses) the parasail 10 response to these maneuvers as time progresses. Some of these maneuvers may not be compatible with the desire to fly towards and reach the target site 18. Therefore they need to be carefully designed so as not to detract too greatly from the main objective (i.e., arriving at the desired target location 18).

It is important to note that the guidance system 100 regulates two things (altitude and heading) with only one guidance command (turn rate). Therefore there are periods of time when a spiraling turn is initiated so as to decrease altitude down to the intended glide slope 210, and other times when a turn rate is initiated so as to steer towards a desired heading 210. Because the parasail 10 does not include a propulsion system, another important issue is that there is no way to recover if the parasail 10 inadvertently falls below the desired glide slope 210. That is, there is no way to make an upward correction. In a powered aircraft, deviations below the desired glide slop 210 are corrected by increasing the power setting of the engines (for example, during the landing of an aircraft).

Therefore, the approach of the guidance system 100 is to incrementally come down to the ideal glide slope 210 in stages, and constantly evaluate the effect of local wind conditions, while leaving some margin for error so that the parasail 10 is always somewhat above the ideal glide slope 210. This is done by inserting weaving maneuvers along the path towards the target site 18. This bias for wanting to remain above the glide slope 210 is gradually removed as the parasail 10 gets closer to the target site 18.

Figure 2:
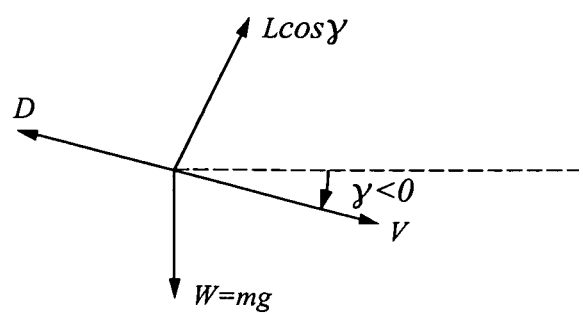
FIG. 2 is a diagram illustrating the force components in the wind frame.

To better understand the adaptive guidance system 100 of the present invention, a discussion of the equations of motions is useful. The force components in the wind frame are depicted in FIG. 2. The equations of motion for gliding flight over a flat and non-rotating Earth, and in a constant wind field can be expressed as:

$$\dot{V}=(-D-W\sin\gamma)m$$

$$\dot{\gamma}=(L\cos\mu-W\cos\gamma)/mV$$

$$\dot{\psi}=L\sin\mu/mV\cos\gamma$$

$$\dot{x}=V\cos\gamma\cos\psi+w_x$$

$$\dot{y}=V\cos\gamma\sin\psi+w_y$$

$$\dot{h}=V\sin\gamma \tag{1}$$

where x, y are the North and East positions relative to the target position, h is the altitude above the Earth surface 16, V is the velocity relative to the air mass, $\gamma$ is the flight path angle, $\psi$ is the heading angle of V, $\mu$ is the bank angle, and m, L, W and D are mass, lift, weight and drag.

The equations for equilibrium flight are obtained by setting $\dot{V}=\dot{\gamma}=0$, which reduces the first three equations in (1) to:

$$D=-W\sin\gamma$$

$$L\cos\mu=W\cos\gamma$$

$$\dot{\psi}=g\tan\mu/V \tag{2}$$

Combining the first two equations in (2), it follows that $$\tan\gamma=-\frac{D}{L\cos\mu}=-\frac{C_D}{C_L\cos\mu} \tag{3}$$

where $C_L=L/QS$ and $C_D=D/QS$ are the lift and drag coefficients, $Q=\rho(h)V^2/2$ is the dynamic pressure, and $\rho(h)$ is the air density as it depends on altitude (h). In equilibrium glide ($\dot{V}=\dot{\gamma}=\dot{\psi}=0$), we further have that $\mu=0$, and it follows from (3) that $$\tan\gamma_g=-C_D/C_L \tag{4}$$

where $\gamma_g$ is the equilibrium glide angle. Comparing (3) and (4), the flight path angle in turning flight can be expressed in terms of the equilibrium glide angle as $$\tan \gamma = \tan \gamma_g / \cos \mu \qquad (5)$$

A relationship between the equilibrium glide velocity ($V_g$) and the equilibrium velocity during turning flight can be derived and has been referred to as V above. From the second equation in (2), we have that $$\rho V_g^2 S C_L = 2W \cos \gamma_g$$

in gliding flight, and $\rho V^2 S C_L = 2W \cos \gamma / \cos \mu$ in turning flight. Therefore $$\frac{V^2}{V_g^2} = \frac{\cos \gamma}{\cos \gamma_g \cos \mu} \qquad (6)$$

For analysis and simulation purposes, it is useful to specify the aerodynamic characteristics of the parasail 10 in terms of $V_g$, the glide ratio (GR) at a specified altitude ($h_o$), and a maximum turn rate ($\dot{\psi}_{max}$). From (4) it can be seen that the glide ratio is related to the lift to drag ratio by $$\tan \gamma_g = -(1/GR) = -C_D/C_L \qquad (7)$$

Given GR and $V_g$, we use the first equality in (7) to compute $\gamma_g$, and then use the second equality in (2) to compute the lift coefficient $$C_L = W \cos \gamma_g / S Q_g, \quad Q_g = \rho(h_0) V_g^2 / 2 \qquad (8)$$

where $\rho(h_o)$ is the air density at the altitude for which GR is specified. Finally, the drag coefficient is computed using the second equality in (7)

$$C_D = C_L / GR \qquad (9)$$

The maximum equilibrium bank angle ($\mu_{max}$) corresponding to $\dot{\psi}_{max}$ is obtained by combining the third equality in (3) with the relations in (4-6). From these relationships it can be shown that $\mu_{max}$ can be computed in terms of $\dot{\psi}_{max}$ by obtaining the real root of the following cubic equation $$C_L^2 x^3 + (C_D^2 - 2C_L^2 - K)x^2 + (C_L^2 - 2C_D^2)x + C_D^2 = 0 \qquad (10)$$

Where $$K = V_g^4 (C_L^2 + C_D^2) \dot{\psi}_{max}^4 / g^4 \qquad (11)$$

$$x = \cos^2 \mu_{max}$$

and g is the acceleration due to gravity. The procedure consists of solving for the positive real root of (10). If we denote a root by $x_r$, then $$\mu_{max} = \cos^{-1}(\sqrt{x_r}) \qquad (12)$$

It can be shown that this produces on one real solution for $\mu_{max}$.

The parasail simulation consists of integrating the following set of equations $$\dot{x} = V \cos \gamma \cos \psi + W_x$$

$$\dot{y} = V \cos \gamma \sin \psi + w_y$$

$$\dot{h} = V \sin \gamma$$

$$\dot{\psi} = g \tan \mu / V$$

$$\dot{\mu} = (-\mu + \mu_c)/\tau \qquad (13)$$

where $\tau$ is the time constant associated with the bank angle transient response, and $\mu_c$ is the bank angle command, which in the case of pneumatic actuation is either 0, $\mu_{max}$ or $-\mu_{max}$ depending on the command issued by the guidance algorithm (0, +1 or −1). Use of these equations amounts to assuming that the parasail 10 is always in a state of equilibrium flight ($\dot{V} = \dot{\gamma} = 0$). The last equation in (13) is used to model the transient behavior of the parasail 10 in transitioning from one flight condition to another.

Figure 3:
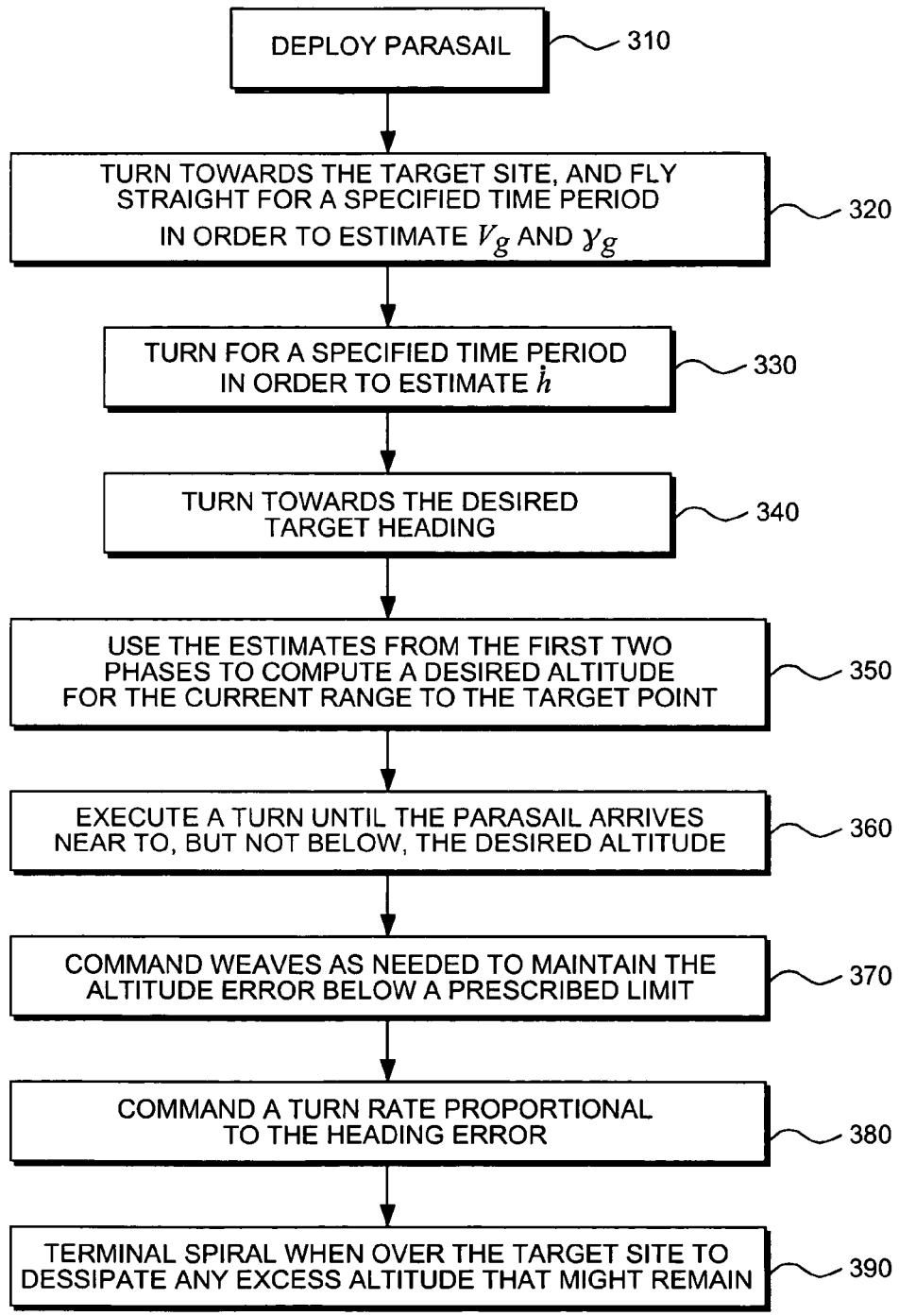
FIG. 3 is a flow chart illustrating one embodiment of the adaptive guidance system according to the present invention.

Based on these equations, the present invention features an adaptive guidance system 100 and method 300, FIG. 3. Upon deployment of the parasail, act 310, the guidance system 100 turns the parasail 10 towards the target site 18, and flies the parasail 10 straight for a specified time period in order to estimate $V_g$ and $\gamma_g$ act 320. Next, the guidance system 100 turns the parasail 10 for a specified time period in order to estimate h, act 330. The guidance system 100 then turns the parasail 10 towards the desired target heading, act 340. Using the estimates from acts 320 and 330, the guidance system 100 determines a desired altitude for the current range to the target point, act 350. The guidance system 100 also executes a turn until the parasail 10 arrives near to, but not below the desired altitude, act 360, executes weaves as needed to maintain the altitude error below a prescribed limit, act 370, and executes a turn rate proportional to the heading error, act 380. When the parasail 10 is over the target site 18, the guidance system 100 executes a terminal spiral to dissipate any excess altitude that might remain, act 390.

During act 320 (the first phase), $V_g$ and $\gamma_g$ are estimated, preferably using a simple average of the GPS sensor data. It is also assumed that $\psi = 0$ while $V_g$ and $\gamma_g$ are estimated. The value for $V_g$ at the target altitude is also estimated by correcting for the ratio of the air densities at the deployment altitude and the target altitude. This correction is derived using the relationship in (8), assuming that the lift coefficient is the same at both altitudes, which for any altitude (h) implies that $\rho(h_o)V_g^2(h_o) = \rho(h)V_g^2(h)$. This assumption follows from the fact that the equilibrium angle of attack should be independent of altitude in order to maintain a zero pitching moment.

During act 330 (the second phase), $\dot{h}$ is estimated using a simple averaging process. This calculation only relies on altitude data, which can be provided either by GPS, an altimeter, or any other device known to those skilled in the art.

During act 340 (the third phase), a turn is executed until the parasail 10 arrives at the desired heading ($\psi_{des}$) to within a prescribed limit. The desired flight heading is given by $$\psi_{des} = a \tan 2(-y, -x) \qquad (14)$$

This is done to align the parasail 10 with the target heading prior to initiating the fourth flight phase.

The fourth flight phase comprises acts 350-380 and is the most complex. During act 350, an average velocity ($V_{bar}$) along the ideal glide slope is first computed by preferably averaging the values $V_g(h)$ and $V_g(h_t)$, where $h_t$ denotes the target altitude. This is then used to compute a desired altitude ($h_{des}$) so that flying at the value of $\gamma_g$, at a speed equal to $V_{bar}$, and at $\psi=\psi_{des}$, the parasail 10 will exactly arrive at the target site 18 at an altitude of $h=h_t$. The calculation is based on the following relationships:

$$-\dot{R}=V_{bar}\cos\gamma_g \cos\delta\psi+W(h)$$

$$\dot{h}=V_{bar}\sin\gamma_g \tag{15}$$

where R is the current horizontal range to the target point 18 (preferably obtained from the GPS data or any other device known to those skilled in the art), W is the estimated wind along $\psi_{des}$, and $\delta\psi$ is the difference between $\psi_{des}$ and the ideal heading of the velocity relative to the air mass when flying along the ideal glide slope at $\psi=\psi_{des}$. This is given by the relation $$\sin\delta\psi=W_p/V_{bar}\cos(\gamma_g) \tag{16}$$

where $W_p$ is the wind component perpendicular to $\psi_{des}$. Taking the ratio of the two equations in (15)

$$-\frac{dR}{dh}=\frac{V_{bar}\cos\gamma_g\cos\delta\psi + W(h)}{V_{bar}\sin\gamma_g} \tag{15}$$

and integrating $$-\int_R^0 dR = \frac{\cos\gamma_g\cos\delta\psi}{\sin\gamma_g}\int_{h_{des}}^{h_t} dh + \int_{h_{des}}^{h_t} W(h)dh/(V_{bar}\sin\gamma_g) \tag{16}$$

Carrying out the indicated integrations $$h_{des}=h_t-\{R\tan\gamma_g+[W_i(h_t)-W_i(h_{des})]/(V_{bar}\cos\gamma_g)\}/\cos\delta\psi \tag{17}$$

where $W_i(h)$ denotes a wind integral along $\psi_{des}$ $$W_i(h) = \int_0^h W(h)dh \tag{18}$$

Since $\psi_{des}$ is variable from one guidance update to the next, the wind integrals are pre-computed along the x and y directions, and tabulated as a function of h as a part of the wind data set. Then the wind integral along $\psi_{des}$ is computed from the tabulated x and y integrals by adding their respective components along $\psi_{des}$. Equation (17) represents a nonlinear algebraic relation for $h_{des}$, which is solved using a fixed-point iteration. We start with a value for $h_{des}$, substitute the value into the right hand side of (17), and obtain a new solution for $h_{des}$.

The process is repeated until the change in $h_{des}$ falls below a specified minimum value (currently 10 ft). The maximum number of iterations is also limited, as a precaution. In experimental tests, the iteration process has never failed to converge, and usually converges within very few iterations. As a final step, the value of $h_{des}$ is biased so that the bias linearly decreases as a function R, but never below a minimum specified value. Once act 350 is initiated, it is recomputed at every guidance update for the remainder of the flight.

During act 360, a number of 360° turns are computed and executed such that the parasail 10 arrives nearest to, but always above the value of $h_{des}$ computed in act 350. The number of turns is computed based on the values of $\dot{h}$ and the value of $\dot{\psi}_{max}$. Act 360 is initiated together with act 350, and continues until the computed number of turns are executed. The value of $h_{des}$ is also biased to further ensure against ending up below $h_{des}$ after completing the turns, which can be caused by actuator rate limits and the fact that $h_{des}$ may be increasing due to the effect that winds have during the 360° turns. Other than possibly decreasing the number of 360° turns, this bias does not affect the subsequent sub-phases of phase 4, whereas the bias introduced in act 350 does.

Act 370 commences after completion of act 360 and continues for the remainder of the flight. Act 370 is intended to initiate and execute a weaving maneuver whenever the altitude error ($h-h_{des}$) exceeds a prescribed limit. The altitude error increases with passing time, and the weave maneuver is intended to reset it to a small value. The growth in the altitude error is primarily due to the gradual reduction in the bias used in the calculation of $h_{des}$ (see act 350). Recall that this bias was introduced to prevent the parasail 10 from ever falling below the ideal glide slope. In this way, even if the present altitude should temporarily fall below $h_{des}$, it will eventually rise above $h_{des}$ due to the gradual removal of the bias term in the calculation of $h_{des}$. Thus the weave maneuver is needed to prevent too great a growth in the altitude error.

Calculation of the weave maneuver entails first commanding a new heading that is perpendicular to the desired heading, and maintaining this heading until the altitude error is reduced to 50% of its original value. At this point the heading command is reset to the calculated ideal value needed to intercept the target site. This procedure does not require GPS coordinates (meaning that IMU heading can be used as an alternate to GPS if the GPS signal is lost during the maneuver).

Act 380 regulates the heading so that $\psi$ is maintained close to $\psi_{des}$. It is executed throughout the fourth flight phase, except during acts 360 and 370. The commanded turn rate is limited in magnitude, and used as the input to the SAS. The desired heading is biased off of the target site 18 to allow for the terminal maneuver in act 390.

Act 390 (the fifth phase) comprises simply removing the bias in $\psi_{des}$ at a point where the turn rate command without the bias exceeds a threshold value. The primary objective of act 390 is to reduce terminal error by decreasing the vertical and horizontal errors while performing a brief terminal spiral maneuver.

The present invention also features a stability augmentation system (SAS) and method. As discussed above, the SAS receives heading rate commands from a guidance system (for example, but not limited to, the guidance system 100 and method 300 described hereinabove) and executes the heading rate commands by controlling one or more actuators/servos which move and are typically connected to deflection of the parasail by steering lines.

Figure 4A:
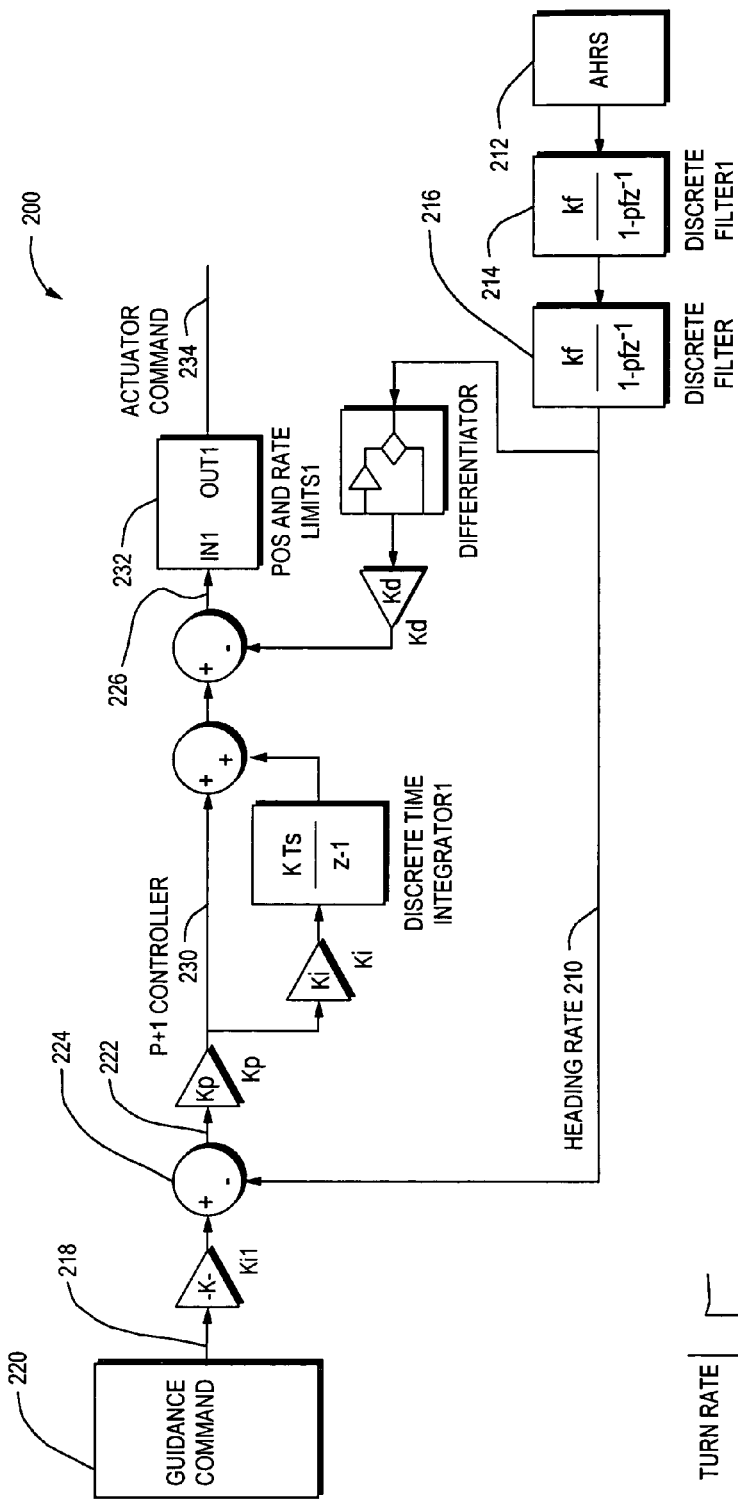
FIG. 4 is a schematic diagram of one embodiment of the stability augmentation system according to the present invention.
Figure 4B:
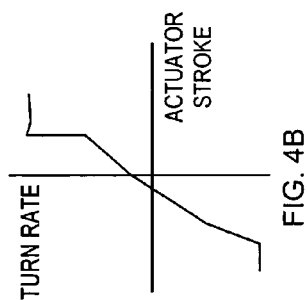

According to one embodiment, the SAS 200, FIG. 4, is intended to operate in the linear region. According to this embodiment, the SAS 200 is a proportional, integral, derivative (PID) controller. The PID gains were tuned using a simulation of the vehicle dynamics, as defined by (13), combined with a model for the servo actuators, that includes a dead zone (to account for slack in the lines), a low gain region (where the turn rate response is low) and a high gain region (where the turn rate response is high). A first order model for each actuator's position response (with a position and rate limit) was included to model the actuator dynamics. Numerical differentiation of the heading rate was used to implement the derivative feedback term.

The SAS 200 receives a signal 218 from a guidance system 220, for example, but not limited to, the adaptive guidance system described hereinabove. The SAS also receives feedback of the heading rate 210 which is computable from the outputs of the attitude/heading reference unit 212. The indicated heading rate 218 is first passed though two identical stages of first order filters 214, 216 to remove noise and harmonic terms due to oscillations in the parasail suspension system.

Next, an error signal 222 is generated by a summer 224 which compares the guidance signal 218 (the heading rate the parasail should be executing) to the indicated heading rate 218 (the parasail's actual heading rate). This error signal 222 is feed into the PID controller 230. The output of the PID controller 230 is summed with the derivative of heading rate to produce the PID output 226. This output is limited by the position and rate limiter 232. The position and rate limiter 232 imposes the physical limitations of the response time of the actuator/servos as well as predefined position limits to prevent the parasail from entering the nonlinear region. The output 234 of the position and rate limiter 232 is the actuation command. This embodiment is only applicable to parasails with known wingloading, for which the domain of linearity is know beforehand.

Figure 5:
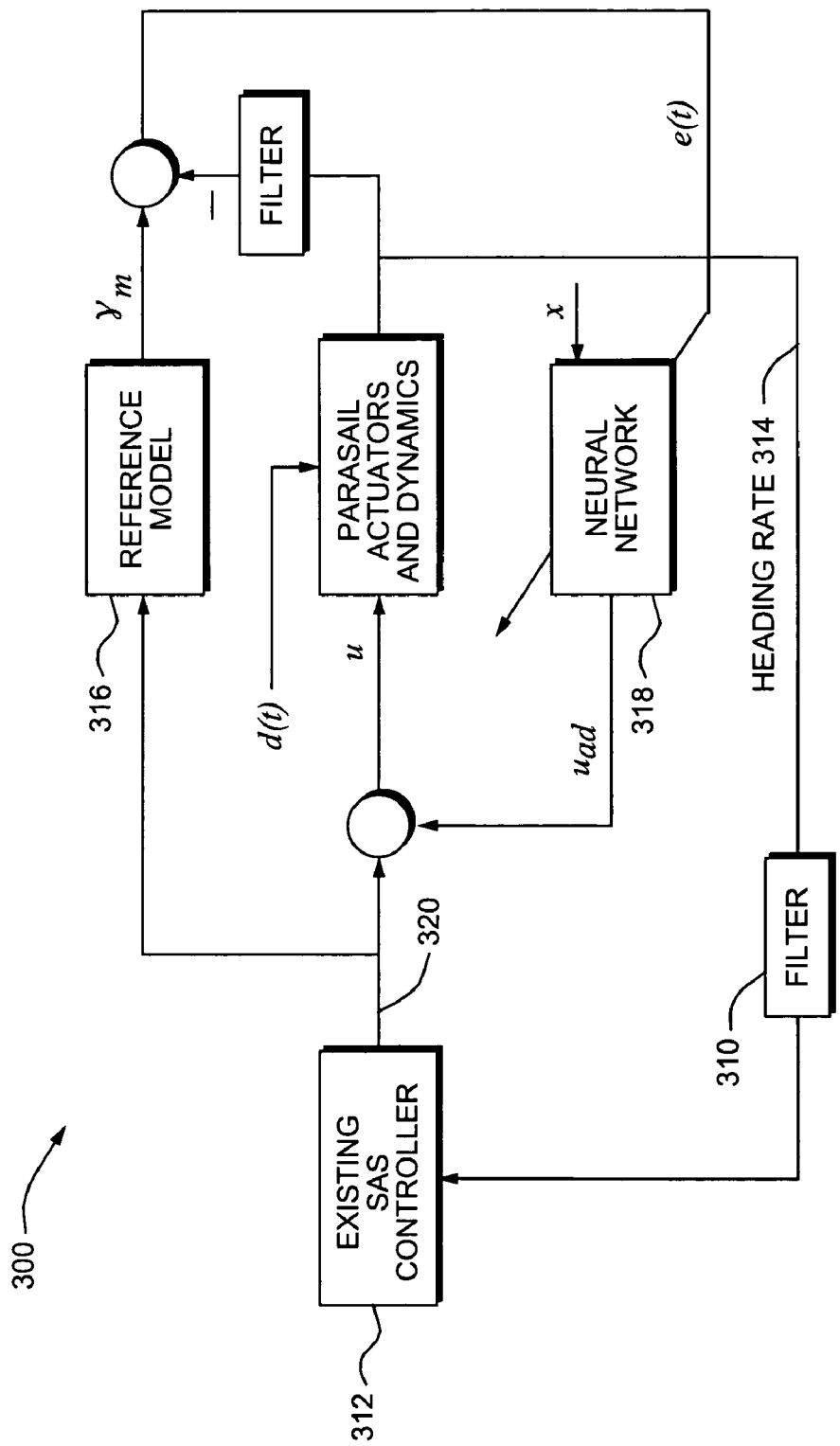
FIG. 5 is a schematic diagram of one embodiment of the adaptive stability augmentation system according to the present invention.

According to another embodiment, the present invention features an adaptive SAS method and system 300, FIG. 5, intended to operate in either the linear and/or nonlinear regions. The filter block 310 that appears in the feedback path to the previously existing SAS controller 312 was used to reduce presence of oscillations in the heading rate signal 316 due to the suspension system, and is a part of the SAS system 200 (FIG. 4) described hereinabove. The blocks 'Reference Model' 316 and 'Neural Network' 318 are new. The reference model 316 contains a low order model for the parasail dynamics, which is filtered in the same manner as the heading rate response of the actual parasail. It also implements a method called 'hedging' that is known to those skilled in the art. If the true parasail response matches that of the reference model 316, then the error signal, e(t), would be zero. The main role of the reference model 316 is to produce this error signal e(t).

The error signal e(t) is used to adapt the weights in the neural network (NN) 318 as will be described in greater detail hereinbelow. The other input to the NN 318 consist of a vector (x) of known variables, such as the heading rate, the reference model output ($y_m$) and the control input to the actuators (u). The adaptive signal ($U_{ad}$) is added to the existing SAS controller 312 output 320 as an augmenting signal, and its main purpose is to reduce the error signal as close as possible to zero. Note that with this architecture, external disturbances (d(t), such as, but not limited to, wind and the like) that affect the parasail dynamics, do not directly affect the reference model dynamics, so in the process of reducing the error signal, the adaptive SAS 300 also achieves a level of disturbance rejection insofar as the disturbances affect the parasail response.

Figure 6:
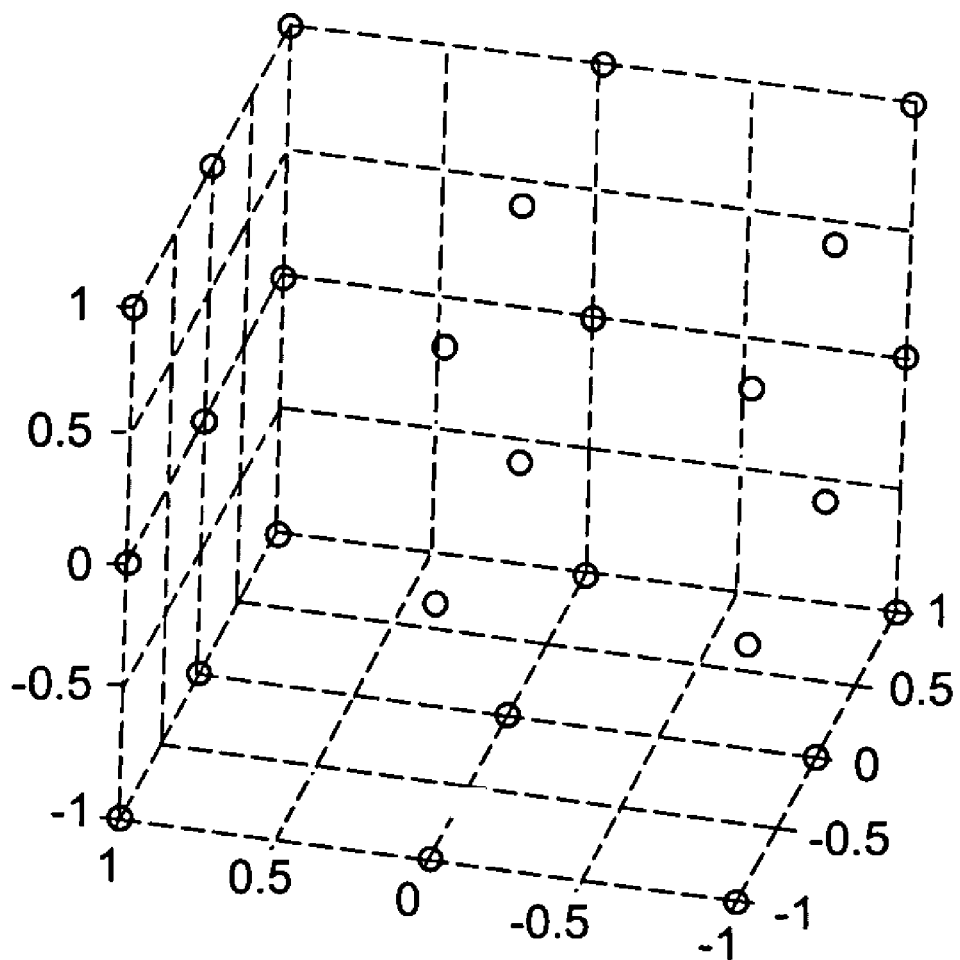
FIG. 6 is a chart illustrating the locations of the centers of the basis functions used by the adaptive stability augmentation system.
Figure 15:
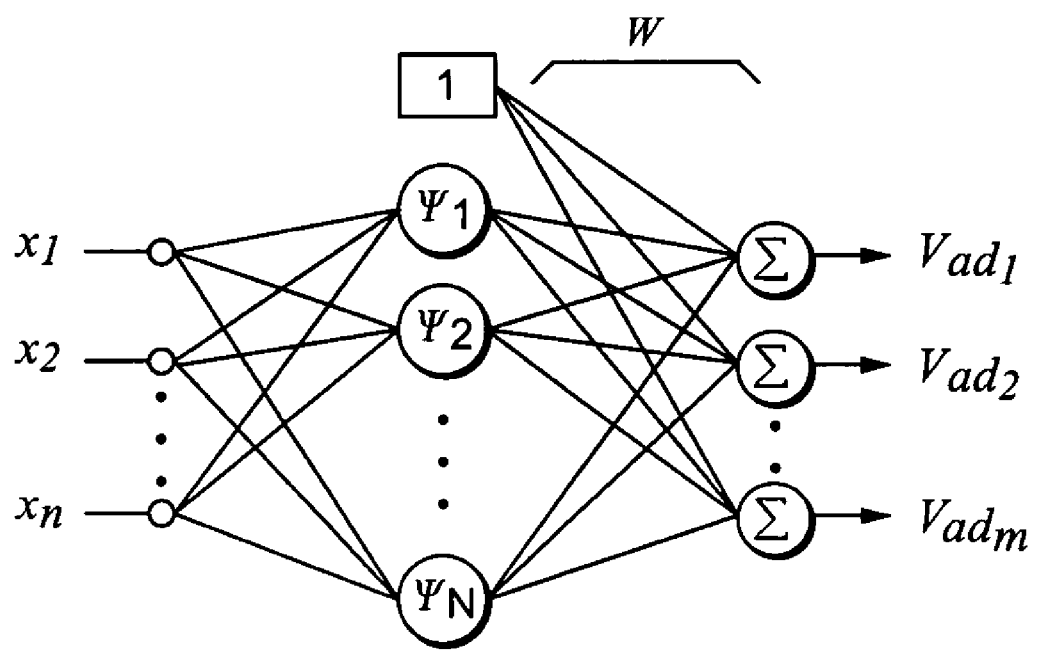
FIG. 15 is an illustration depicting the neural network having N basis functions and m outputs according to one embodiment of the present invention.

In one embodiment of the present invention, the NN output ($U_{ad}$) at each sample time (n) is computed as a weighted sum of basis functions, plus a term proportional to the error signal $$u_{ad}(n) = -\sum_{i=1...28} W_i \phi_i(x(n)) + K_e e(n) \quad (19)$$

where e(n) is the error signal, and $\phi_i(x(n))$ denotes the NN basis functions operating on the network inputs. In this case the basis functions consist of shifted Gaussian functions having the form $$\phi_i = \exp\{-[(x_1-c_{1,i})^2+(x_2-c_{2,i})^2+(x_3-c_{3,i})^2]/\sigma^2\} \quad (20)$$

for i=1 ... 27, and $\psi_{28}$=1, which is known as the bias term. The resulting network is known as a radial basis function network. The are numerous other forms in which the network can be realized. A depiction of this network having N basis functions and m outputs is given in FIG. 15. For the multiple output case, the output layer weights represented by $\hat{W}$ is matrix having m rows and N columns. In this application, m=1. The elements of the input vector ($x_i$) are normalized so that they approximately range between ±1. The parameters $c_{k,i}$ and $\sigma$ (normally the mean and $\sqrt{2}$ times the standard deviation in a Gaussian probably density function), are referred to as the center and width of the basis function. Note that each basis function has a different center, and each center has 3 components, one for each input to the NN. If we think of the inputs as elements of a 3 dimensional space, then centers $$C_i = [c_{1,i}, c_{2,i}, c_{3,i}], i=1 ... 27 \quad (21)$$

can be thought of as a points in this space. These points are chosen so that they grid the space. Since the $x_i$ are normalized, the input space is approximately a cube centered at the origin, having a length of 2 on each side. Since there are 27 centers, and the grid points in the cube are chosen so that they are equally spaced, the locations of the centers are as shown in FIG. 6. The NN input quantities and center locations are chosen so as to achieve acceptable performance from the SAS design 300 without requiring excessive computations when implementing the NN. In the preferred embodiment, it has been determined that having 3 inputs and 27 centers is a reasonable compromise. The width for each basis function was chosen as $\sigma$=0.5.

The NN weights are adapted according to the following adaptation law $$W_i(n+1) = W_i(n) - F*T*e_f(n)*\phi_i(x(n)) \quad (22)$$

where n denotes a sample time, T is the sample interval, $e_f(n)$ is a filtered version of the error signal, and x(n) denotes the NN input vector. Since the sample rate is 20 Hz, T=0.05. So long as each weight computed using (23) does not exceed a specified bound (presently 1.0 for each $W_i$), then (22) completely defines the time history of the weights. However, if any one of the weights should exceed this bound at any sample time, then all of the weights are adjusted so that largest weight is on its bound, and the remaining weights are $\leq$ to their respective bounds. The method used to do this adjustment is known a 'parameter projection', which is one of a variety of methods in adaptive control used to prevent a phenomenon known as 'parameter drift'. This phenomenon can occur when the error signal is small over an extended period of time. The limit on the weights may have to be adjusted based on flight test results. For the results discussed below that have been adjusted based on the behavior observed in simulation, which should be close to what will be observed in flight.

The following examples illustrate the performance of the adaptive SAS 300. It is know from previous results that when the guidance commands are limited so that the command turn rate does not exceed 0.5 rad/s then the parasail responds nearly in a linear fashion. However, if the commanded turn rate exceeds this value by a sufficient amount, then the parasail can exhibit a highly nonlinear response in which the turn rate can no longer be regulated by the SAS. The transition where this occurs is a function of the wing loading, which is not known beforehand.

Figure 7:
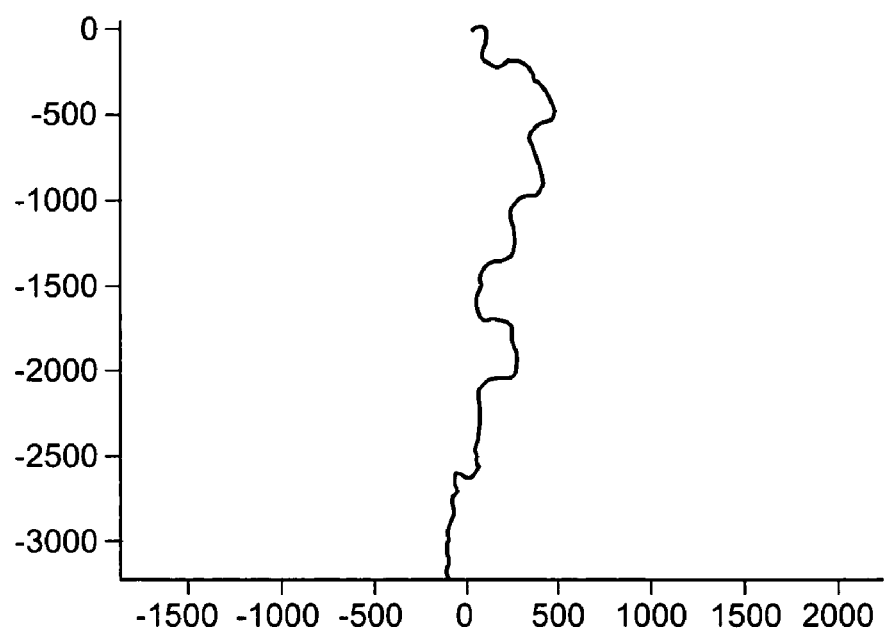
FIG. 7 is a chart illustrating the trajectory of a parasail using a maximum turn rate of 1.5 rad/s.
Figure 8:
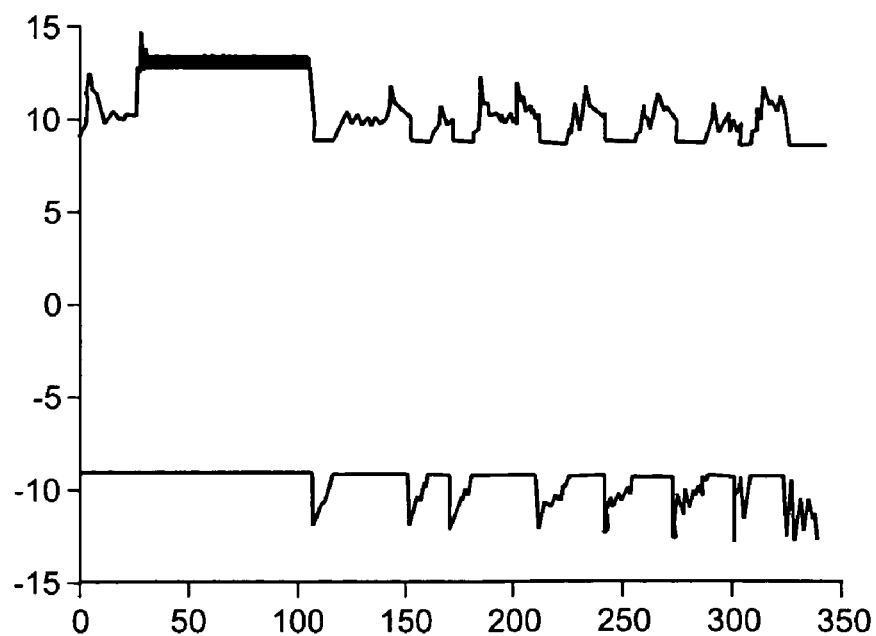
FIG. 8 is a chart illustrating the corresponding right and left actuator displacements.
Figure 9:
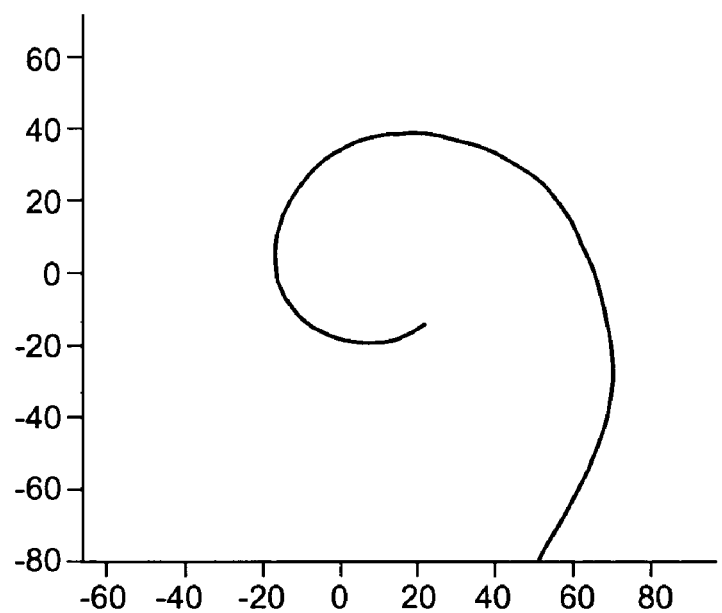
FIG. 9 is a chart illustrating an expanded view of the trajectory near the terminal site.
Figure 10:
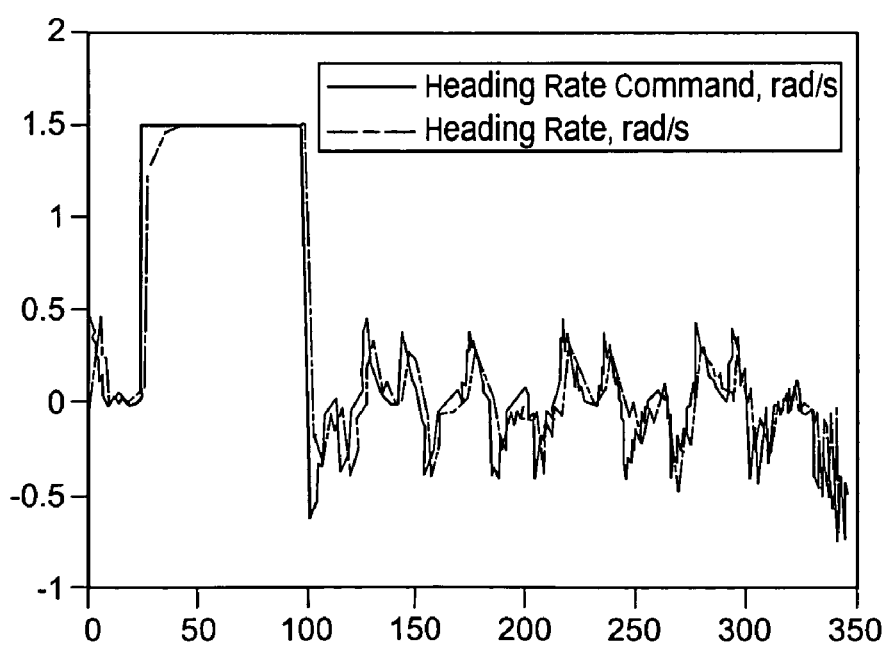
FIG. 10 is a chart illustrating the tracking performance of the adaptive stability augmentation system according to the present invention.

The adaptive SAS 300 has about the same bandwidth as the SAS design 200 described hereinabove. The only difference is that the PI gains have been adjusted so that they are appropriate for the parasail when operating at a high turn rate. In the SAS design 200 the gains were set for a low turn rate command. FIG. 7 shows a trajectory in which the maximum turn rate command is 1.5 rad/s. The corresponding right and left actuator displacements are shown in FIG. 8. Note the low level oscillations that are apparent during the spiral maneuver. This is largely due to the oscillations that occur in the heading rate feedback signal that originate from the suspension system. FIG. 9 shows an expanded view of the trajectory near the terminal site. Note that terminal accuracy is significantly improved over what we have seen when the turn rate limit is 0.5 rad/s. The same is true in the vertical plane (not shown). FIG. 10 shows the really excellent tracking performance achieved by the adaptive SAS 300 during periods of both low and high turn rate commands.

Figure 11:
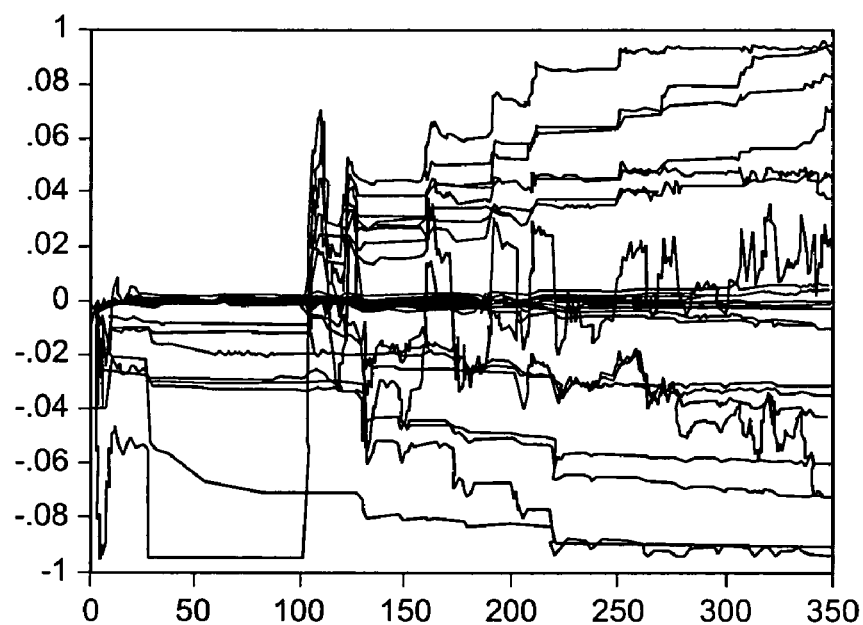
FIG. 11 is a chart illustrating the neural network weight histories.
Figure 12:
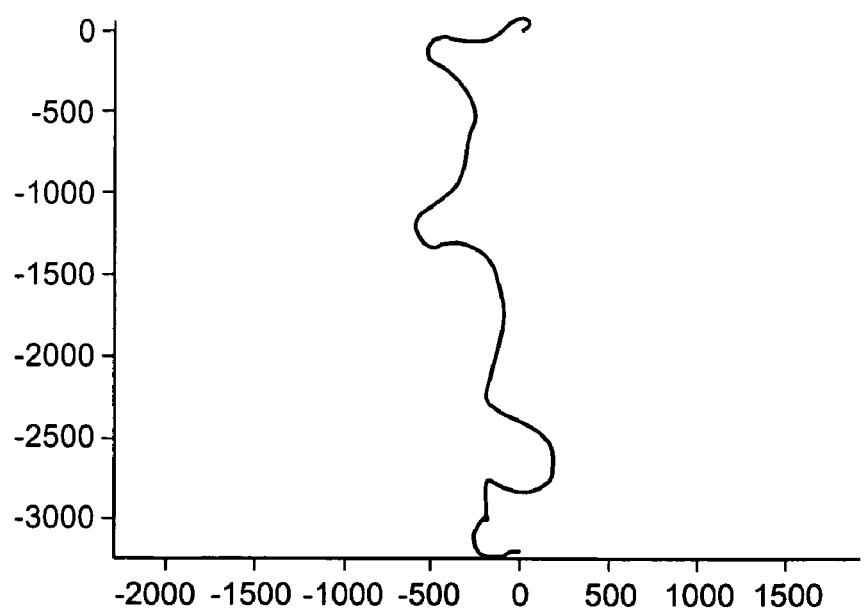
FIG. 12 is a chart illustrating the trajectory of a parasail without adaptation.
Figure 13:
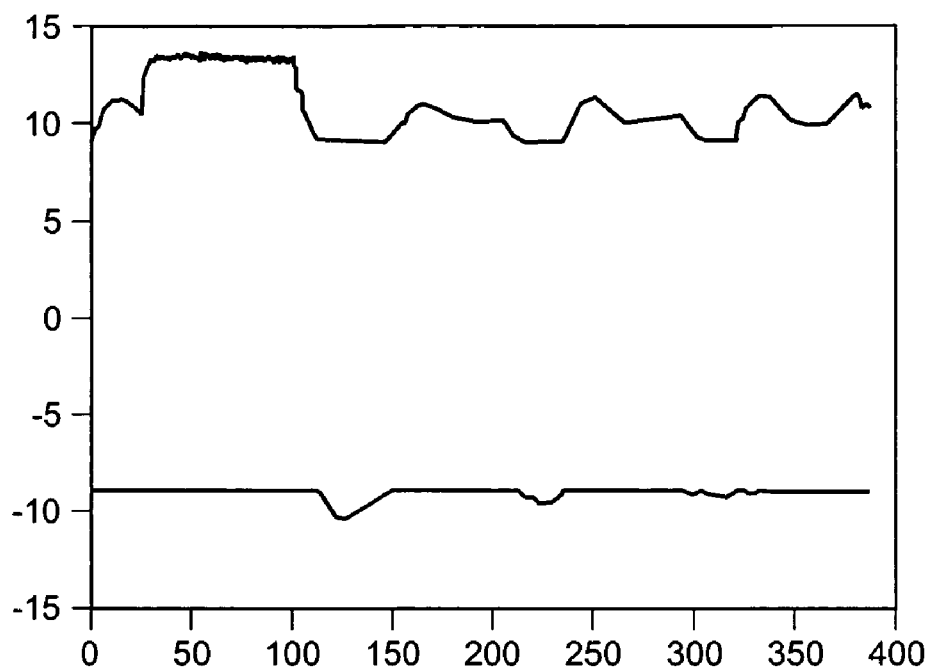
FIG. 13 is a chart illustrating the right and left actuator displacements without adaptation.

FIGS. 12 and 13 show the trajectory and actuator displacements for the same case as in FIGS. 5-10, but without adaptation. In comparing these results with FIGS. 7 and 8 keep in mind that the simulation does not allow the bank angle to exceed 80 degrees. This prevents an instability from occurring in the simulation, whereas in actuality the response of the parasail can exhibit a much wilder response during periods of high turn rate. It can be seen in FIG. 11 that the response is very sluggish during periods of low turn rate command. This is a consequence of setting the SAS gains to values appropriate for high turn rate commands. If this was not done, then the response without adaptation would be very bad during the spiral.

Figure 14:
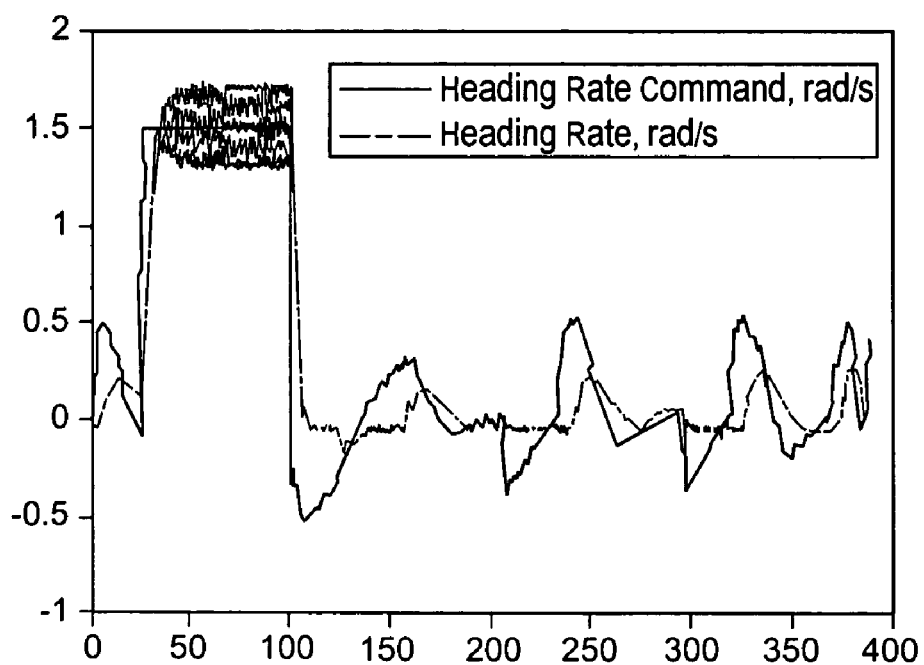
FIG. 14 is a chart tracking the performance of the stability augmentation system without adaptation.

FIG. 13 shows that the actuator behavior is much less sensitive to the oscillations caused by the suspension system. FIG. 14 confirms the fact that tracking performance of the non-adaptive SAS 200 is very poor, and exhibits a large oscillation during the spiral maneuver. The actual parasail response is likely to exhibit a tumbling behavior during the spiral.

In summary, the adaptive SAS 300 is more sensitive to oscillations caused by the suspension system than is the non-adaptive SAS 200. However, the overall performance when operating in both the linear and nonlinear region of the parasail dynamics is far superior.

As mentioned above, the present invention is not intended to be limited to a system or method which must satisfy one or more of any stated or implied object or feature of the invention and should not be limited to the preferred, exemplary, or primary embodiment(s) described herein. The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the claims when interpreted in accordance with breadth to which they are fairly, legally and equitably entitled.

The invention claimed is:

1. A stability augmentation method for an adaptive guidance system for a parasail, for use in regulating the altitude and heading of the parasail, said method comprising the acts of:

generating a reference model output signal based on a reference model;

receiving from an attitude and heading reference system, an actual heading rate signal;

generating an error signal by a summer, said error signal proportionate to the difference between said reference model output signal and said actual heading rate signal; and responsive to said error signal, generating by a neural network an adaptive signal, wherein said neural network is responsive to both weights and to a vector comprising a plurality of known variables, wherein said weights of the neural network are adapted based on said error signal for use in regulating the altitude and heading of the parasail.

2. The method as claimed in claim 1 wherein said plurality of known variable includes the actual heading rate signal, the reference model output signal, and a control input to an actuator.

3. The method as claimed in claim 1 wherein said reference model includes a low order model for a parasail dynamics.

4. The method as claimed in claim 1 wherein said act of receiving said actual heading rate includes receiving said actual heading rate from an attitude and reference system.

5. The method as claimed in claim 1 further including the act of adding said adaptive signal to a linear stability augmentation system to generate an augmenting signal.

6. The method as claimed in claim 1 wherein said weights of the neural network are adapted according to the adaptation law $$W_i(n+1)=W_i(n)-F*T*e_f(n)*\phi_i(x(n))$$

where n denotes a sample time, T is a sample interval, $e_f(n)$ is a filtered version of the error signal, and x(n) denotes an input vector.

* * * * *